United States Patent
Hafner et al.

(10) Patent No.: US 7,793,168 B2
(45) Date of Patent: *Sep. 7, 2010

(54) DETECTION AND CORRECTION OF DROPPED WRITE ERRORS IN A DATA STORAGE SYSTEM

(75) Inventors: James L. Hafner, San Jose, CA (US); Carl E. Jones, Tucson, AZ (US); David R. Kahler, Tucson, AZ (US); Robert A. Kubo, Tucson, AZ (US); David F. Mannenbach, Tucson, AZ (US); Karl A. Nielsen, Tucson, AZ (US); James A. O'Conner, Ulster Park, NY (US); Krishnakumar S. Rao, Fremont, CA (US)

(73) Assignee: International Business Machines Corporation, Armonk, NY (US)

( * ) Notice: Subject to any disclaimer, the term of this patent is extended or adjusted under 35 U.S.C. 154(b) by 530 days.

This patent is subject to a terminal disclaimer.

(21) Appl. No.: 11/843,804

(22) Filed: Aug. 23, 2007

(65) Prior Publication Data

US 2009/0055584 A1 Feb. 26, 2009

(51) Int. Cl.
*G06F 11/00* (2006.01)
(52) U.S. Cl. .................. 714/54; 714/42; 714/805; 370/248
(58) Field of Classification Search ............ 714/42, 714/805; 370/248
See application file for complete search history.

(56) References Cited

U.S. PATENT DOCUMENTS

| | | | | |
|---|---|---|---|---|
| 4,319,356 A * | 3/1982 | Kocol et al. .................. 714/754 |
| 4,733,396 A * | 3/1988 | Baldwin et al. ............... 714/764 |
| 5,233,618 A * | 8/1993 | Glider et al. .................... 714/6 |
| 5,278,839 A * | 1/1994 | Matsumoto et al. ........... 714/710 |
| 6,212,208 B1 * | 4/2001 | Yoneda et al. ................ 370/538 |
| 2003/0135794 A1* | 7/2003 | Longwell et al. ............... 714/42 |
| 2003/0145270 A1 | 7/2003 | Holt |
| 2004/0123032 A1 | 6/2004 | Talagala et al. |
| 2005/0216063 A1* | 9/2005 | Hoyme et al. .................. 607/2 |
| 2005/0251628 A1 | 11/2005 | Jarvis et al. |
| 2006/0075287 A1 | 4/2006 | Vageline et al. |
| 2006/0109792 A1 | 5/2006 | Broadbent et al. |
| 2006/0179381 A1 | 8/2006 | Durica et al. |
| 2006/0242459 A1 | 10/2006 | Hyde, II et al. |

* cited by examiner

OTHER PUBLICATIONS

U.S. Appl. No. 11/843,791, filed Aug. 23, 2007, entitled "Detection and Correction of Dropped Write Errors in a Data Storage System".

*Primary Examiner*—Robert Beausoliel
*Assistant Examiner*—Jeison C Arcos
(74) *Attorney, Agent, or Firm*—Dan Shifrin

(57) ABSTRACT

Method, system and computer program product are provided for detecting and correcting dropped writes in a storage system. Data and a checksum are written to a storage device, such as a RAID array. The state of the data is classified as being in a "new data, unconfirmed" state. The state of written data is periodically checked, such as with a timer. If the data is in the "new data, unconfirmed" state, it is checked for a dropped write. If a dropped write has occurred, the state of the data is changed to a "single dropped write confirmed" state and the dropped write error is preferably corrected. If no dropped write is detected, the state is changed to a "confirmed good" state. If the data was updated through a read-modified-write prior to being checked for a dropped write event, its state is changed to an "unquantifiable" state.

5 Claims, 3 Drawing Sheets

DETECTION AND CORRECTION OF DROPPED WRITE ERRORS IN A DATA STORAGE SYSTEM

TECHNICAL FIELD

The present invention relates generally to data storage systems, and in particular, to detecting and correcting dropped write errors.

BACKGROUND ART

The basic operation of hard disk drives (HDDs) is well known in the art. It is also known that HDDs are complex electromechanical units and, as such, are subject to a wide variety of failure mechanisms. Microscopic defects in the magnetic coding materials used on the platter, contamination of the platter with dust, dirt or magnetic particles and aging can all cause data loss. As with all electronics, random failure can occur from a wide variety of underlying physical processes or small defects associated with manufacturing processes. Moving parts are subject to friction and wear out over time which can also cause HDD assemblies to fail.

SUMMARY OF THE INVENTION

The present invention provides a computer program product having computer-readable code embodied therein for detecting and correcting dropped writes in a data storage system. The computer-readable code includes instructions for executing the steps of the present invention. Data, including first data and at least a first checksum associated with the first data, are written to a storage device, such as a RAID array, in a full stride write. The state of the first data is classified as being in a first "new data, unconfirmed" state. The state of written data is periodically checked, such as may be determined by a timer, to determine whether a dropped write event has occurred. If a dropped write event is detected during a periodic check of the first data, its state is changed from the first state to a second "single dropped write confirmed" state. Preferably, the dropped write will then be corrected and the state of the first data changed to a third "confirmed good" state. If no dropped write event is detected, its state is changed from the first state to the third state.

The present invention also provides a RAID system having an array of disk storage drives, a RAID array controller, a parity generator operable to generate at least a first checksum associated with first data, a data write module operable to write data, including the first data and the at least first parity symbol, to the array in a full stride write, and a dropped write check module operable to periodically check the written data to determine whether a dropped write event has occurred. The system also includes a data state module operable to classify a state of the first data as being in a first "new data, unconfirmed" state when the first data is written to the array, change the state of the first data from the first state to a second "single dropped write confirmed" state if a dropped write event is detected during a periodic check, and change the state of the first data from the first state to a third "confirmed good" state if no dropped write event is detected. The system may also include a timer by which the periodic checks may be regulated.

DETAILED DESCRIPTION OF THE PREFERRED EMBODIMENT

Figure 1:
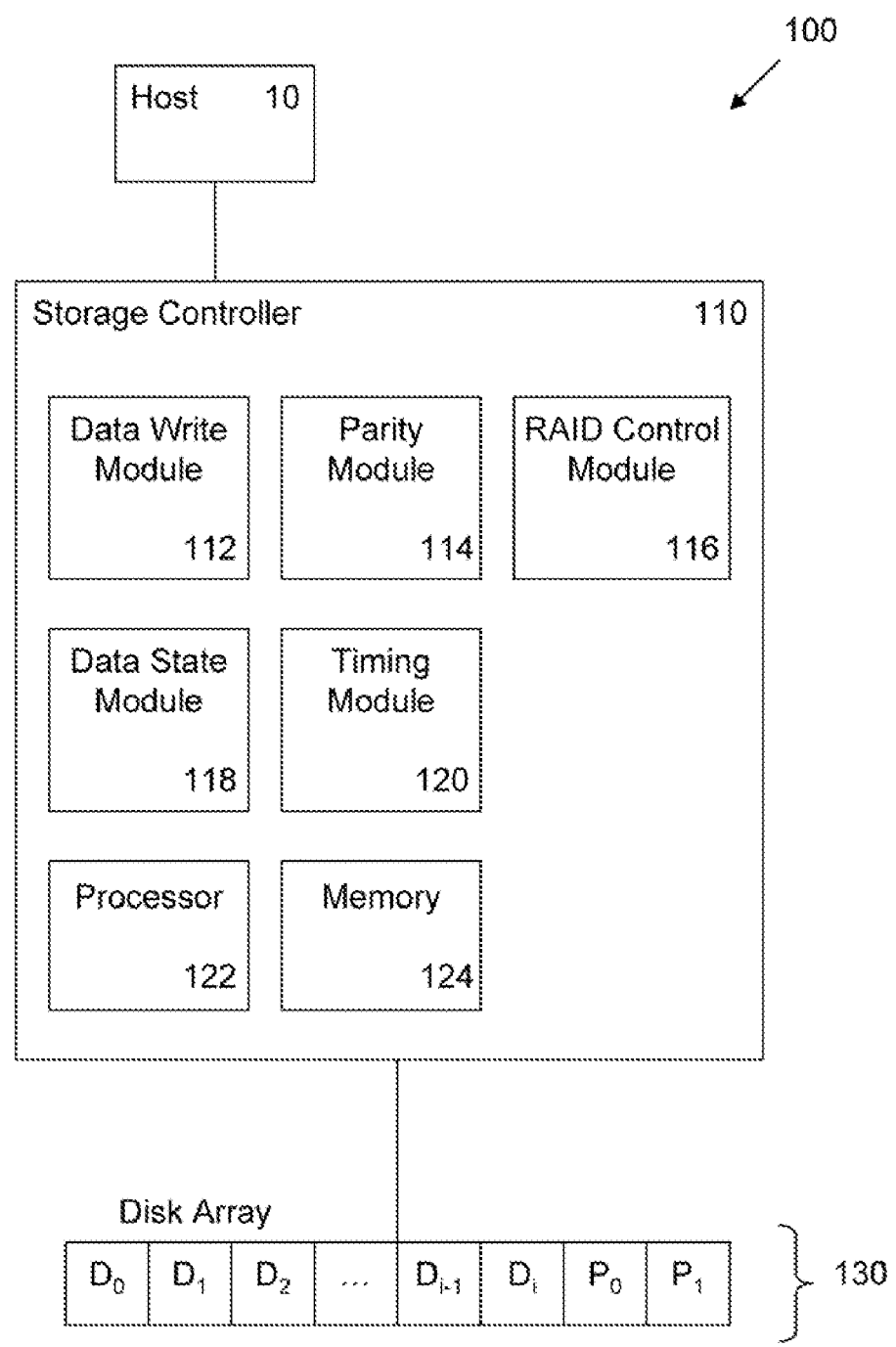
FIG. 1 is a block diagram of a storage system in which the present invention may be implemented.

Not all HDD failures manifest themselves as a solid hard failure of the entire hard disk assembly. Some problems are more subtle and can be difficult to detect. For example, it is crucial to be able to precisely locate the magnetic read/write head to the exact position over the platter to ensure that the data is written to or read from the correct location on the platter. Slight variations can result in data being written to or read from the wrong location.

Many techniques have been used and improved over the years to help ensure that HDD failures do not cause data loss or data integrity issues due to more subtle failure modes. Embedded checkers such as error correction codes (ECC) are used on HDDs to detect bad sectors. Cyclic redundancy checks (CRCs) and longitudinal redundancy checks (LRCs) may comprise embedded checkers used by HDD electronics or disk adapter or they may comprise checkers used by higher levels of code and applications to detect HDD errors. CRCs and LRCs are written coincident with data to help detect data errors. CRCs and LRCs are hashing functions used to produce a small and substantially unique bit pattern generated from the data. When the data is read from the HDD, the check sum is regenerated and compared to what is stored on the platter. The signatures must match exactly to ensure the data retrieved from the magnetic pattern encoded on the disk is what was originally written to the disk.

Systems of redundant array of independent disks (RAID) have been developed to improve performance or to increase the availability of disk storage systems or both. RAID distributes data across several independent HDDs. There are many different RAID schemes that have been developed, each having different characteristics and different benefits and disadvantages associated with them. Performance, availability and utilization/efficiency (the percentage of the disk space that actually holds customer data) are perhaps the most important. The tradeoffs associated with various schemes have to be carefully considered because improvements in one attribute can often result in reductions in another.

RAID-5 is a widely used scheme that achieves a good balance between performance, availability and utilization. It uses a single parity field that is the XOR (exclusive-OR) of the data elements across multiple unique HDDs. In the event of a single HDD failure, the data on the remaining HDDs is used with the parity field to reconstruct the data from the failed HDD by XOR-ing the data on the remaining disks together to recreate the data from the failed disk. As with many other RAID schemes, RAID-5 has a performance advantage in that it is not necessary to read the data from all HDDs in a data stripe (full stride write or FSW) in order to recalculate the new parity value for the stripe every time a write occurs. Rather, when writing small amounts of data to update a single data element, a technique known as read-modified-write (RMW) is used whereby the old data from a single HDD is read along with the old parity from another HDD. The old data is XOR-ed with the new data and old parity to produce a new parity which is then written to appropriate disk along with the new data. This may be a considerable performance improvement, especially with wider (larger N−N+P ) RAID-5 arrays.

However, because an HDD rebuild can often take several hours to complete, if another disk in the RAID-5 array fails before the first failed HDD is replaced and the data rebuilt on the new disk, all of the data associated with the RAID-5 array will be lost. Thus, RAID-5 can only tolerate a single HDD failure and there is no way to reconstruct the data when two HDDs fail.

RAID-6 is an extension to RAID-5 in which a second independent checksum field is introduced. While RAID-5 can continue to operate in the presence of a single HDD failure, RAID-6 can continue to operate in the presence of two HDD failures. In RAID-6, the second checksum field may be created using Reed-Solomon coding or using simple RAID-5-like XORs where no data element of the XOR is used more than once to generate the check sums.

One HDD failure mode that is particularly troublesome is a dropped write which occurs when a disk controller issues a write command to a HDD and receives a response back from the HDD indicating the write completed successfully. However, the write to the HDD did not actually occur. Although normally rare, there are a variety of failure mechanisms that can cause dropped writes. There may have been a failure in the write pre-amp. A small piece of metal shaving in the drive may have shorted out the write head. Other, subtle or intermittent failure of the write heads can cause a dropped write. A code problem in the HDD assembly may cause it as well.

A situation which is comparable to a dropped write can also occur if the write head is not centered over the correct track or is located entirely over the incorrect track. In the latter case, a subsequent read operation proceeds and the data read from the track looks valid, but is stale. In the former case, in which the write was not centered properly, the drive may generate a bad ECC when it attempts to read the data back from the center of the track. To compensate, the drive then offsets the heads slightly one way or the other to attempt to get good data. If the head is offset one way, it will get the correct data but if it is offset the other way, it will get stale data. As used herein, the term "dropped write" error or event will include both of these conditions as well as the condition described in the immediately previous paragraph.

Unfortunately, embedded checkers such as ECC used on HDDs to detect bad sectors as well as CRCs and LRCs that are used by the disk controller/disk adapter or higher levels of code and applications may prove ineffective in detecting dropped write errors. These checkers cannot always detect a dropped write because the data read from the disk location is not of a bad content. When a request is made to the drive to read the sector, valid data is read from the media but it is not the correct data. Rather, the data is stale; that is, the data that is read is the data that was present before the last write and that was not overwritten by new data when it should have been. Thus, all of the checkers may still be valid for the old data and provide no indication of an error. It will be appreciated that when such incorrect data is retrieved from a drive but the drive does not indicate the presence of an error, RAID reconstruction techniques are not invoked and cannot be used to locate and correct the error.

Dropped writes can be difficult to detect and there is concern that they can potentially cause serious customer data corruption and restoration issues. Every read-modified-write using bad (including stale) data from a dropped write serves to further propagate the data errors to other HDDs in the RAID array causing migration and expansion of the data corruption and making it all the more difficult to determine which HDD originally caused the problem. In fact, in some scenarios, the propagation of an undetected dropped write can modify the RAID checksum in such a way that makes it impossible to detect the condition.

Failure analysis data indicates that dropped writes typically manifest themselves in a single hard drive in an array and may propagate. Consequently, it is important to quickly and accurately identify the drive exhibiting the problem.

As an example of error propagation from a dropped write condition, consider a RAID-5 array with three data disks and one parity disk (3+P) is initially in a good state, with all disks being present and the parity being in sync with the data. The array initially resembles the following (where the '+' sign represents the XOR function):

| Disk 1 | Disk 2 | Disk 3 | Parity Disk |
|--------|--------|--------|-------------|
| A      | B      | C      | P = A + B + C |

Assume first that the data in A needs to be changed; the new data for A will be indicated as A'. When the new data is written, the parity must also be updated. First, using the read-modified-write process, the old data A on Disk 1 and the old data P on the parity disk are read from the drives. Then the new parity P' is calculated by XOR'ing the old parity P with the old data A to remove the old data A from the parity and then XOR'ing the result with the new data A'. Thus, the new P'=P+A+A'=A+B+C+A+A'=A+A+A'+B+C. The two As cancel leaving P'=A'+B+C. Finally, the new data A' and parity P' are written to the disks:

| Disk 1 | Disk 2 | Disk 3 | Parity Disk |
|--------|--------|--------|-------------|
| A'     | B      | C      | P' = A' + B + C |

Next assume that Disk 1 is dropping writes. The array again initially resembles the following:

| Disk 1 | Disk 2 | Disk 3 | Parity Disk |
|--------|--------|--------|-------------|
| A      | B      | C      | P = A + B + C |

First, the old data A on Disk 1 and the old data P on the parity disk are read from the drives. Then the new parity P' is calculated. Again, P'=P+A+A'=A+B+C+A'=A+A+A'+B+C=A'+B+C and the new parity is still calculated correctly. Finally, the new data A' and parity P' are written to their respective disks. However, this time Disk 1 does not actually perform the write. The disks thus resemble the following:

| Disk 1 | Disk 2 | Disk 3 | Parity Disk |
|--------|--------|--------|-------------|
| A      | B      | C      | P' = A' + B + C |

Note that Disk 1 still contains the old data A, not the new data A', but the new parity indicates that the data on Disk 1 should be A'. If the data on Disk 1 was rebuilt or reconstructed at this point, the correct data could still be rebuilt from A'=B+C+P'. If, however, the data on Disk 1 is not rebuilt or reconstructed, the array remains in an "Initial Corrupted State." From this state, the corruption can propagate to the parity in a number of ways, two of which will be described.

First, starting in the initial corrupted state, assume that a new write of A occurs; designated as A". The data on Disk 1, still the original A, and the data on the parity disk, now P', are read from the drives. The new parity is calculated as P"=P'+A+A"=A'+B+C+A+A". Nothing cancels because the data A read from Disk 1 is not the data A' that was used to generate the parity P'. A" and P" are now written to the disks and again, Disk 1 drops the write. The disks now resemble the following:

| Disk 1 | Disk 2 | Disk 3 | Parity Disk |
|---|---|---|---|
| A | B | C | P" = A + A' + A" + B + C |

The parity is corrupted and there is no way to reconstruct correct data A". If it is now detected that Disk 1 is dropping writes the data is rejected, then the data that will be generated in the rebuild will be P"+B+C=A+A'+A", clearly invalid data. If the rest of the members of the array, B and C, were read instead of the old A to calculate parity in a full stride write, then the parity would have been correctly calculated. However, this is not done is due to its adverse effect on performance. For arrays wider than 3+P, it takes fewer drive operations to perform a read-modified-write as described above.

A second example of the manner in which an error from a dropped write may propagate starts in the initial corrupted state shown above. Assume in this example that we a write is made to both B and C. The new data will be B' and C' and since these are recorded with a single write, there is only one update of the parity. In this case, it takes fewer drive operations to read the rest of the array than it does to read only the changing data. So the old data A is read from Disk 1 and there is no need to read the parity P. A new parity P" is calculated from the data A that was read from Disk 1 and XOR'ing it with the new data B' and C' for Disks 2 and 3. The new parity will be P"=A+B'+C'. P" is incorrect because the data for Disk 1 should have been A', not A. The disks will now resemble the following:

| Disk 1 | Disk 2 | Disk 3 | Parity Disk |
|---|---|---|---|
| A | B' | C' | P" = A + B' + C' |

Although the parity is now consistent with the data which is actually on the disks, the write of A' has now been completely lost. It was not part of the generation of the new parity P" and cannot be recovered.

The present invention may be employed with RAID codes, such as RAID-5, which rely on a single checksum process to detect a dropped write. The present invention may further be employed with multiple checksum RAID codes, such as RAID-6. With such codes, an additional property becomes available that can be used to both detect and correct dropped writes. In general, for minimum distance codes like Reed-Solomon (RS) codes comprised of symbols made up of m-bit sequences, the erasure correction capability (when the data error is pinpointed through some independent means) is determined as:

$$e+2t \leq d_{min} \leq n-k$$

where $d_{min}$ is the code minimum distance, n is the total number of code symbols, k is the number of data symbols being encoded and t is the error correction capability (the capability of the code to pinpoint and correct an error). For RAID-6, where there are two checksums:

$$e+2t \leq d_{min} \leq n-k=2$$

$$e+2t=2$$

Either two errors may be corrected when the location is pinpointed by an independent means or the RAID-6 code may be used to detect a single error, pinpoint its location and then correct it. The present invention provides method, apparatus and computer program product for taking advantage of this property. Although described in the context of a RAID-6 environment, the correction aspect of the present invention may be employed with any multiple checksum code.

FIG. 1 is a block diagram of a storage system 100 in which the present invention may be implemented. The system 100 includes a storage controller 110 and an array 130 of hard disk drives (HDDs) 140. The controller 110 is interconnected with one or more hosts 10, either directly or through a network, and receives requests from the host 10 to write data to and read data from the array 130. In a RAID-6 environment, the array 130 includes a number of HDDs $D_0$-$D_i$ on which customer data is stored and HDDs $P_0$, $P_1$ on which parity checksums are stored. The array 130 illustrated in FIG. 1 is simplified for clarity; parity in RAID 5 and 6 arrays is rotated among the drives. Thus, no drive will contain all data or all parity.

The controller 110 provides a number of functions, any or all of which may be implemented in hardware, software, firmware or in any combination and which will be referred to herein as "modules." A data write module 112 encodes and formats data before it is written to the array 130. A checksum or parity generator module 114 generates parity or other checksum for a data stripe during a write operation and regenerates parity during a read operation. A RAID control module 116 supervises the writing of a data stripe and parity across the HDDs $D_0$-$D_i$ and $P_0$, $P_1$. The controller 110 also includes a data state module 118 and a timer 120 whose functions will be described below. The controller 110 further includes a processor 122 (which may actually comprise multiple processors) and memory 124 (which may comprise one or more of any type of computer readable, volatile or non-volatile medium usable with a programmable computer and having computer-readable code embodied therein). Any of the functions performed by the modules may be executed by the processor from program instructions stored in the memory 124. For clarity, other, commonly used storage components are not shown in FIG. 1.

Figure 2:
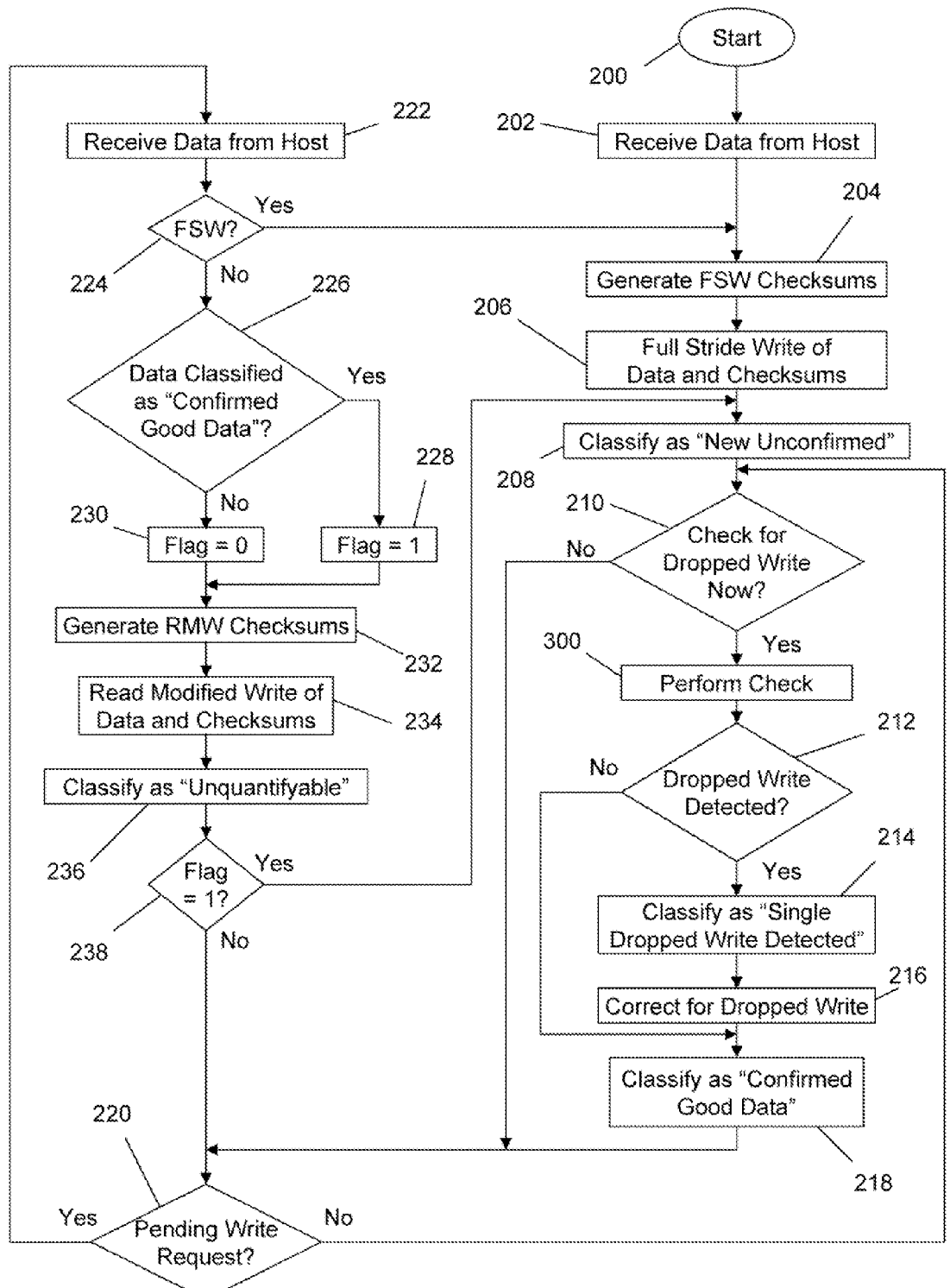
FIG. 2 is a flowchart of a method of the present invention.

A method of the present invention will be described with reference to the flowcharts of FIGS. 2 and 3. When the process is begun (step 200), new data to be written to the array 130 is received from the host 10 by the storage controller 110 (step 202). Full stride write checksums are generated by the parity module 114 (step 204) and the data and checksums are written to the array 130 in an FSW operation (step 206). Because the data has not yet been checked for dropped writes, it is classified as being in a "new unconfirmed" state (step 208).

Next, a determination is made as to whether a check is to be made of the array 130 for a dropped write event (step 210). For example, the timer 120 may be used to periodically determine if a predetermined interval has expired. When the interval has expired, the state of a selected stride of data previously written to the array 130 is checked (step 300). Alternatively, or in addition, selected data may be checked for dropped writes at other times, such as during periods of low system utilization. If the interval has not yet expired, or if the system is not in a period of low utilization, the process jumps to step 220 to determine if a write request is pending.

Figure 3:
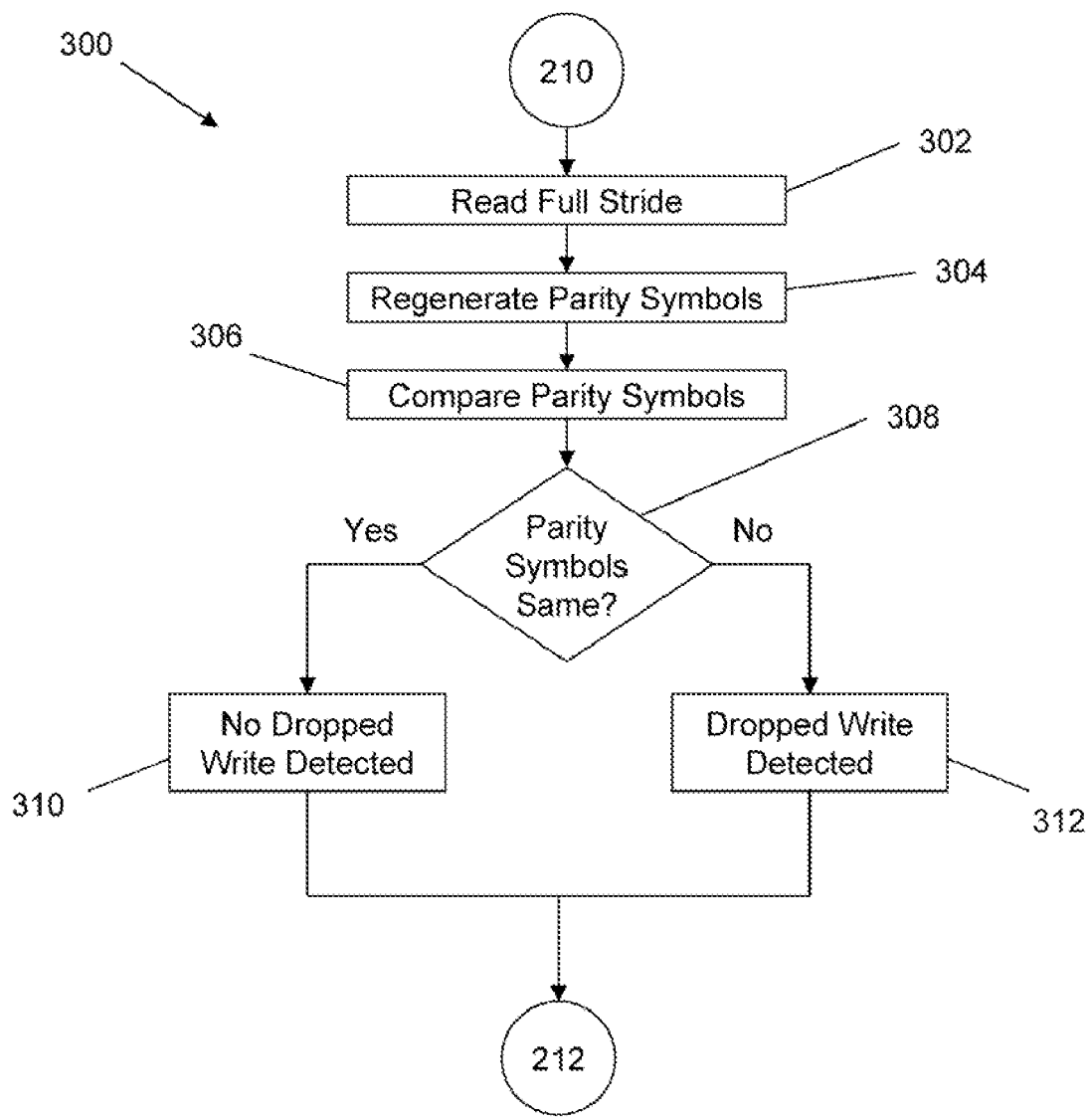
FIG. 3 is a flowchart of a dropped write detection method which may be used with the present invention.

One method for detecting a dropped write error, a "parity scrub," is illustrated in the flowchart of FIG. 3. The full stride of the selected data, including the original checksums, is read from the array 130 (step 302) and the parity module 114 regenerates the checksums (step 304). The original checksums read from the array 130 are compared with the regenerated checksums (steps 306 and 308). If the two sets match, that is an indication that there is no dropped write error in the selected data (step 310) and the selected data is classified by the data state module 118 as being in a "good confirmed" state (FIG. 2, step 218). If, on the other hand, the two sets of checksums are not the same and an independent checker, such as an ECC or CRC/LRC checker, does not indicate that an error is present, it is likely that a dropped write error is present and needs to be corrected (step 312) and the process advances to the next step in the process (FIG. 2, step 214). If the present invention is implemented with a single checksum code, the single checksum or parity symbol will be used to detect a dropped write event. A dropped write error may also be detected through a "read-back" check. The selected data is read back and compared to a copy saved, such as in a buffer or cache, in the storage controller 110. If the two do not match and an independent checker does not indicate that an error is present, it is likely that a dropped write error is present.

After the check for a dropped write has been performed (step 300), a determination is made as to whether a dropped write event has been detected (step 212). If so, the selected data is classified by the data state module 118 as being in a "single dropped write detected state" (step 214). When the present invention is implemented with a multi-checksum code, the dropped write is preferably corrected (step 216). For example, if the data on disk $D_1$ is stale, the data on the other disks are read and XOR'ed with the parity symbols on the parity disks $P_0$, $P_1$. The resulting data will be the correct data which is then written to disk $D_1$. If the correction is successful, or if no dropped write is detected at step 212, the selected data is then re-classified by the data state module 118 as being in the "confirmed good data" state (step 218). A determination is then made as to whether a write request is pending (step 220). If not, the process returns back to step 210 to determine if a check should be made for a dropped write.

If, on the other hand, a write request is pending at step 220, the data is received from the host (step 222). A determination is made as to whether, because the data is extensive enough, a full stride write is to be performed over existing data (step 224). If so, FSW checksums are generated (step 204) whereupon the process described above continues.

If an FSW is not to be performed, the data is to be written to the array 130 in a read modified write operation. A determination is made as to whether the data to be overwritten was previously classified by the data state module 118 as being in a "confirmed good data" state (step 226). If so, a flag or other indicator is put into a first state, such as by setting a bit to a '1' (step 228); otherwise, the flag is put into a second state, such as by setting the bit to a '0' (step 230). The parity module 114 then generates RMW checksum symbols (step 232), the data and checksums are written to the array 130 in an; RMW process (step 234). The data is then classified by the data state module 118 as being in an "unquantifiable" state (step 236), indicating that a dropped write error may no longer be reliably detected or corrected and may thereby propagate errors through the data.

The flag that was set in steps 228 or 230 is checked (step 238). If the flag indicates that the data received from the host had not been previously classified as being in the "confirmed good data" state, a determination is made as to whether there is a pending write request (step 220). If so, the process returns to step 222 to receive the data from the host. If at step 238 it is determined that the flag indicates that the data was classified as being in the "confirmed good data" state, the data is reclassified by the data state module 118 as being in the "new, unconfirmed" state (step 208) and the process continues.

The present invention ensures acceptable performance by reducing how often a check is made for dropped write errors, thereby significantly reducing any adverse impact on performance. For example, it is possible to execute one check without impacting performance. However, if several checks are made in a row, a serious performance problem may be created. The present invention includes a mechanism to limit the frequency with which attempts to detect dropped write errors are made; in the illustrated embodiment, the limiting mechanism may be the timer 120. More specifically, but by way of example and not limitation, assume that about 20 ms are required to read a 32K block of data from a single HDD in the array 130. Assume further that the array 130 consists of 10 HDDs. It would, therefore, take about 200 ms to perform a parity scrub (that is, to read an entire stride, regenerate the checksums and compare the original checksums with the regenerated checksums). One-fifth of a second would add up to a significant amount of time if the parity scrub was performed frequently. However, if the present invention is implemented and the predetermined interval of the timer 120 is set so that a parity scrub is performed only once each minute, a relatively small and insignificant $\frac{1}{300}$ of a minute is needed.

In addition to implementing the present invention in storage systems in actual use in customer facilities, the present invention may also be used as a stress test as part of a quality control process following the manufacture of HDDs. For example, the HDDs may be rigorously exercised and then the process of the present invention be enabled in such a manner as to prevent the HDDs from being placed in the "unquantifiable state." HDDs which exhibit a tendency to produce dropped writes could thus be weeded out and not placed into service. In a similar fashion, the process of the present invention may be used by service technicians as a field stress exerciser on unused areas of a customer's HDDs. Intermittent and previously undiagnosable errors caused by dropped writes may thus be identified.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies regardless of the particular type of signal bearing media actually used to carry out the distribution. Examples of computer readable media include recordable-type media such as a floppy disk, a hard disk drive, a RAM, and CD-ROMs and transmission-type media such as digital and analog communication links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated. Moreover, although described above with respect to methods and systems, the need in the art may also be met with a computer program product containing instructions for detecting and correcting dropped writes in a data storage system.

What is claimed is:

1. A computer program product of a computer readable storage medium usable with a programmable computer, the computer program product having computer-readable code embodied therein for detecting dropped write events in a data storage system, the computer-readable code comprising instructions for:
   receiving first data from a host;
   writing data, including the first data and at least a first checksum associated with the first data, to a storage device in a full stride write;
   classifying a state of the first data as being in a first "new data, unconfirmed" state;
   periodically checking the written data to determine whether a dropped write event has occurred;
   changing the state of the first data from the first state to a second "single dropped write confirmed" state if a dropped write event is detected during a periodic check;
   changing the state of the first data from the first state to a third "confirmed good" state if no dropped write event is detected during the periodic check;
   receiving second data from the host;
   if the second data is to be written to the storage device in a full stride write,
      generating at least a second checksum and writing the second data and the at least second checksum to the storage device in a full stride write;
   if the second data is to be written to the storage device in a read modify write (RMW):
      generating at least one RMW checksum and writing the second data and the at least one RMW checksum to the storage device in a read modify write; and
      changing the state of the second data from the second state to a fourth "unquantifiable" state.

2. The computer program product of claim 1, wherein the instructions for detecting a dropped write event in the first data comprise instructions for:
   reading a full stride of the first data;
   regenerating a checksum from the first data;
   comparing the regenerated checksum with the first checksum;
   changing the state of the first data from the first state to the second state if the regenerated checksum is different from the first checksum; and
   changing the state of the first data from the first state to the third state if the regenerated checksum is the same as the first checksum.

3. The computer program product of claim 1, further comprising instructions for, if the first data is in the second state:
   correcting the dropped write; and
   changing the state of the first data from the second state to the third state.

4. The computer program product of claim 1, wherein the storage device is an array of storage drives and writing the data comprises writing the data using a multi-checksum RAID coding.

5. The computer program product of claim 1, wherein the instructions for periodically checking the written data comprise instructions for:
   setting a timer to the predetermined interval;
   starting the timer;
   upon the expiration of the predetermined interval, checking one stride of the written data;
   resetting the timer to the predetermined interval; and
   repeating the starting, checking and resetting steps.

\* \* \* \* \*